United States Patent [19]

Gafter

[11] Patent Number: 5,666,296
[45] Date of Patent: Sep. 9, 1997

[54] METHOD AND MEANS FOR TRANSLATING A DATA-DEPENDENT PROGRAM TO A DATA FLOW GRAPH WITH CONDITIONAL EXPRESSION

[75] Inventor: Neal M. Gafter, Allen, Tex.

[73] Assignee: Texas Instruments Incorporated, Dallas, Tex.

[21] Appl. No.: 815,442

[22] Filed: Dec. 31, 1991

[51] Int. Cl.$^6$ .................................. G06F 17/00
[52] U.S. Cl. ........................................ 364/578
[58] Field of Search ..................... 364/578, 191, 364/DIG. 2, 931.55, 920.4; 371/19; 395/650, 700

[56] References Cited

U.S. PATENT DOCUMENTS

| | | | |
|---|---|---|---|
| 4,860,204 | 8/1989 | Gendron et al. | 395/700 |
| 5,005,119 | 4/1991 | Rumbaugh | 364/DIG. 2 |
| 5,276,881 | 1/1994 | Chan et al. | 395/700 |

OTHER PUBLICATIONS

Tanner; "Providing Programmers With a Driver Debug Technique"; Hewlett Packard Journal Nov. 1989.
Quayle et al; "Efficient DAG Synthesis"; IEEE 1990.
Reiss; "Pecan: Program Development Systems that Support Multiple Views"; IEEE Tran. Software Eng. Mar. 1985.
Shung et al.; "An Integrated CAD System For Algorithm-Specific IC Design"; IEEE 1989.
Duncan et al; "Experiments With Hi-Pass DSP Synthesis System" IEEE 1992.
Kobrosly et al; "A Survey of Software Functional Testing Techniques"; IEEE 1988.
Banning; "The XDOS Binary Code Conversion System"; IEEE 1989.

*Primary Examiner*—Ellis B. Ramirez
*Attorney, Agent, or Firm*—Robert L. Troike; Leo N. Heiting; Richard L. Donaldson

[57] ABSTRACT

The method comprises the steps of converting the algorithm into a control flow graph having a plurality of nodes, each node representing at least one of the plurality of statements. The control flow graph further includes a conditional branching node for the data-dependent conditional branching statement. Reverse dominators are then computed for each of the plurality of nodes, from which a meet point node for each conditional branching node is derived. The method further provides for constructing a shadow symbol table housing the variables, and constructing a duplicate shadow symbol table for each possible value of the datum in response to the conditional branching node. The conditional branching node is also evaluated by assuming each possible value of the datum for each branch and assigning symbolic values to each of the variables in the shadow symbol table. The nodes contained in each branch are evaluated until the meet point node is reached. The duplicate shadow symbol tables are then merged. The symbolic evaluation continues until all the conditional branches are evaluated and the end of the control flow graph is reached to provide a conditional expression representing the algorithm.

14 Claims, 2 Drawing Sheets

5,666,296

METHOD AND MEANS FOR TRANSLATING A DATA-DEPENDENT PROGRAM TO A DATA FLOW GRAPH WITH CONDITIONAL EXPRESSION

TECHNICAL FIELD OF THE INVENTION

This invention relates in general to the field of symbolic interpretation. More particularly, the present invention relates to a method for symbolic evaluation of algorithms with data-dependent control flow.

BACKGROUND OF THE INVENTION

Custom integrated circuits are often designed to implement certain digital signal processing (DSP) applications to achieve the required performance. This is especially true with DSP applications requiring parallel architectures which perform computations in one clock cycle. The designer typically implements the DSP algorithm first in software, which provides a test-bed for the algorithm. Once the DSP algorithm is sufficiently tested and debugged in software, the algorithm is implemented again in hardware to reflect the software implementation. However, due to the different tools and basic building blocks available in hardware design, the resultant hardware implementation may function differently from the software prototype, or fail altogether. Therefore, a translator is needed which can derive a hardware implementation directly from a software implementation, so that errors from the reimplementation process can be eliminated.

One identified way to achieve the software to hardware translation is to first translate the software algorithm into a data flow graph from which a hardware circuit can be derived. One technique of translation is symbolic evaluation, which is related to the compilation technique of partial evaluation. Partial evaluation evaluates portions of the program with known inputs and the portions of the program with unspecified inputs are evaluated only at run time. Symbolic evaluation, on the other hand, treats and computes all inputs symbolically. Therefore, if the program has no data dependencies, it can be evaluated fully. However, few algorithms are data independent. For example, an algorithm has data-dependent control flow if the condition of an IF statement or the bound on a FOR loop is dependent on some input data.

Conventional methods of symbolic evaluation cannot satisfactorily handle algorithms with data-dependent control flow. Accordingly, a need has arisen for a technique for symbolic evaluation of algorithms with data-dependent control flow. Such technique not only would benefit the application thereof to DSP hardware design, but also to optimization of programs by compilers, and to those applications where parallelism needs to be exploited.

SUMMARY OF THE INVENTION

In accordance with the present invention, a method for data-dependent control flow symbolic evaluations is provided which substantially eliminates or reduces the disadvantages and problems associated with prior techniques.

In one aspect of the present invention, a method for symbolic evaluation of an algorithm is provided. The algorithm has at least one conditional branching statement dependent on the value of at least one input datum. The method comprises the steps of converting the algorithm into a control flow graph having a plurality of nodes, each node representing at least one of the plurality of statements. The control flow graph further includes a conditional branching node for each data-dependent conditional branching statement. Reverse dominators are then computed for each of the plurality of nodes, from which a meet point node for each conditional branching node is derived.

The method further provides for constructing a shadow symbol table housing all the variables referred to in the algorithm, and for constructing a duplicate shadow symbol table for each possible value of the datum in response to a conditional branching node. In other words, an instance of the shadow symbol table is made for each possible branch of a conditional branching statement when evaluation reaches it.

The method further evaluates each node symbolically in succession according to control flow, and assigns a symbolic value to each the variables in the shadow symbol tables. A conditional branching node is evaluated by assuming each possible value of the datum for each branch and assigning symbolic values to each of the variables in the shadow symbol table. Each branch is evaluated separately and successively until its meet point node is reached. The duplicate shadow symbol tables are then merged to provide a conditional expression representing each variable that has acquired a different symbolic value along the separate branches.

An important technical advantage of the present invention provides a technique for eliminating the data-dependent control flow so that a software implementation of an application algorithm may be converted to a data flow graph for a direct translation to a hardware implementation, such as a custom application specific integrated circuit (ASIC).

A further important technical advantage of the present invention provides for a symbolic evaluation technique which is useful in optimization of programs by compilers, and to those applications requiring a high degree of parallelism.

BRIEF DESCRIPTION OF THE DRAWINGS

For a better understanding of the present invention, reference may be made to the accompanying drawings, in which.

DETAILED DESCRIPTION OF THE INVENTION

Figure 1:
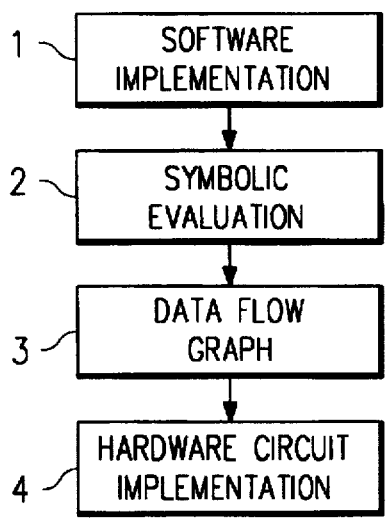
FIG. 1 is a greatly simplified diagram showing the process of translating a software implementation to hardware circuit implementation.

With reference to the drawings, FIG. 1 illustrates a simplified diagram of the translation process from a software algorithm implementation of a specified application to a hardware circuit implementation. Traditionally, a circuit designer first implements the application algorithm in software. The software can then be sufficiently tested to ensure the integrity of the algorithm. The designer then must re-implement the algorithm in hardware as faithly as possible to mirror the software implementation. The dual implementation of the application in software and hardware is particularly necessary in certain digital signal processing (DSP) applications where a high degree of parallelism in the architecture is required. Therefore, the translation process enables the elimination of the error-prone step of re-implementing the tested software algorithm in hardware.

Referring to FIG. 1, the software implementation 1 is generally expressed in a high level computer language, such as C and FORTRAN. The software implementation 1, is then interpreted by a symbolic evaluation method 2, which yields a data flow graph 3 representation of the software implementation. From the data flow graph 3, a hardware circuit implementation 4 of the application algorithm can then be derived.

The software implementation almost always contains data-dependent control flow paths that cannot be handled by conventional symbolic evaluation techniques in the translation process. The present invention provides a technique for symbolic evaluation of algorithms with data-dependent control flow.

Figure 2:
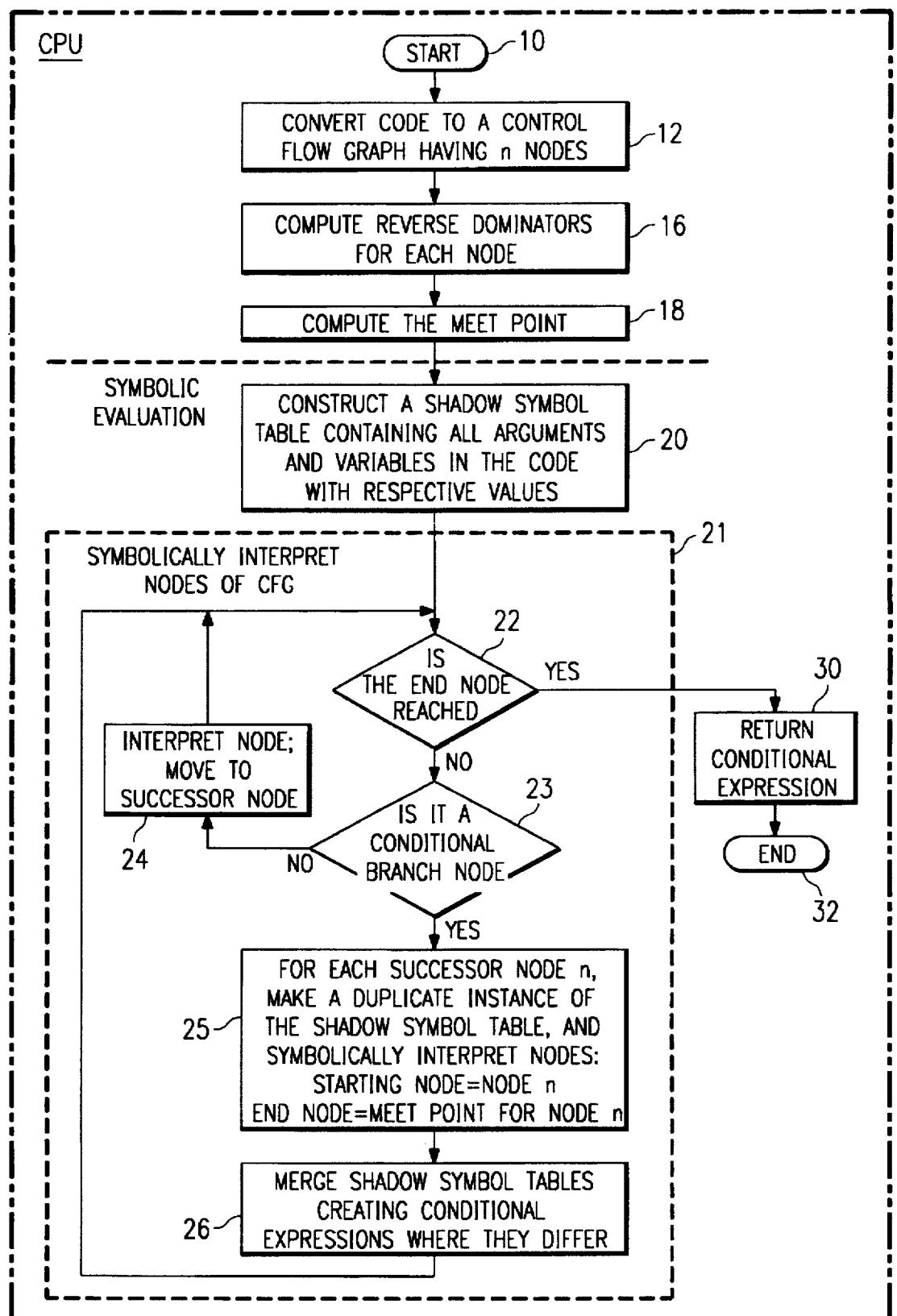
FIG. 2 is a simplified flowchart of the preferred embodiment of the present invention.

Referring to FIG. 2, the bulk of the translation process begins in block 10. The software implementation code 1 is first converted to a control flow graph having N nodes, as shown in block 12. Such control flow graph conversion technique is conventional in the field of compiler design and code optimization, such as those discussed in *Compilers, Principles, Techniques, and Tools* by Alfred V. Aho et al., incorporated herein by reference. The conversion process typically constructs data structures such as tree structures to house the data flow graph. Conceptually, the data flow graph contains nodes where each node contains a set of executable statements, without internal branching, from the software algorithm.

A better understanding of the present technique may be had by also referring the following software code example written in C++:

```
int x, y;
int EXAMPLE_A(int c)
{
    int i;
    if (c)
        i = y;
    else
        i = x;
    return i;
}
```

EXAMPLE A

Figure 3:
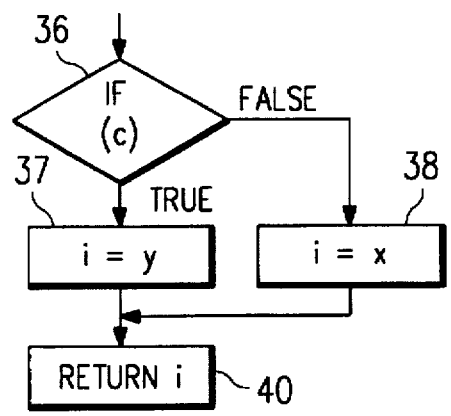
FIG. 3 is a representative control flow graph of an algorithm serving as an illustrative example for a better understanding of the present invention.

The control flow graph of the algorithm in EXAMPLE A is shown in FIG. 3. The control flow graph in FIG. 3 has four nodes 36, 37, 38 and 40. In node 36, if the variable c in the conditional expression is true or nonzero, control flows to node 37 and the variable i is assigned the value of variable y. If, on the other hand, variable c is false or zero, then control flows to node 38, where variable i is assigned the value of variable x. The value of variable i is returned in node 40. Therefore, it can be seen that EXAMPLE A contains a conditional expression i the value of which is dependent on the value of input c, making node 36 a conditional branch node.

Proceeding to block 16 in FIG. 2, reverse dominators are computed from the control flow graph derived in block 14. Reverse dominators of a given node are defined as the set of nodes through which control from that given node is guaranteed to pass. A pseudo code algorithm for finding the reverse dominator of a control flow graph with a set of nodes N and final node $n_0$ is as follows:

$$\begin{aligned}
&\text{for each } n \in N \\
&\quad R(n) := N; \\
&R(n_0) := \{n_0\}; \\
&\text{while changes to any } R(n) \text{ occur do} \\
&\quad \text{for n in N do} \\
&\quad\quad R(n) := \{n\} \cup \bigcap_{s \in suc(n)} R(s); \quad\quad (1)
\end{aligned}$$

where R(n) is the set of reverse dominators of node n, and suc(n) is the set of successors of node n. Successors of a node n is defined as the set of nodes directly following node n in the flow of execution. For example, the successors of node 36 in FIG. 3 are nodes 37 and 38. If algorithm (1) above is followed, the reverse dominators for EXAMPLE A are:

$$\begin{aligned}
&R(36): \{36, 40\} \\
&R(37): \{37, 40\} \\
&R(38): \{38, 40\} \\
&R(40): \{40\},
\end{aligned}$$

where R(n) is the set of reverse dominators for node n, and N includes {36, 37, 38, 40}. It can be seen that for each node, the set of reverse dominators includes itself.

Proceeding to block 18 in FIG. 2, a meet point is computed from the sets of reverse dominators. If a node has more than one successor node, i.e. is a conditional branch node, then its meet point is computed from among those nodes that reverse dominate it, but excluding the conditional branch node itself. The reverse dominator that is reverse dominated by the rest of the reverse dominators for a particular conditional branch node is the meet point for that conditional branch node. The pseudo-code algorithm for computing the meet point for a conditional branch node n is set forth below:

$$\begin{aligned}
&\text{candidate} := R(n) - \{n\}; \\
&\text{meet\_pt} := \text{some element of candidate}; \\
&\text{for n in candidate} - \{\text{meet\_pt}\} \text{ do} \\
&\quad \text{if meet\_pt} \in R(n) \text{ then} \\
&\quad\quad \text{meet\_pt} := n; \quad\quad (2)
\end{aligned}$$

Therefore, node 40 is the meet point for conditional node 36 in FIG. 3.

After the meet point is computed in block 18, the preparation steps are complete and the process of symbolic evaluation begins in block 20. A data structure called a shadow symbol table is constructed, as shown in block 20. A representative example of a shadow symbol table is shown below:

TABLE A c: "c"
x: "x"
y: "y"

The shadow symbol table contains entries for the argument, static variables, and global variables. Each entry is assigned a symbolic value reflecting the variable name. The symbolic values for the entries are shown as strings, but are preferably implemented as directed acyclic graphs.

At this point, the nodes in the control flow graph (CFG) are interpreted successively, as shown in block 21 in FIG. 2.

The starting node for the symbolic evaluation is set as the initial node of the control flow graph, e.g. node 36, and the end node is set as the final node, which is node 40.

In block 22, a determination is made as to whether the end node has been reached, which presently is node 40. Since the end node 40 has not been reached, execution proceeds to node 23, where a determination of whether the present node is a conditional branch node is made. Since, node 36 contains a data-dependent branching expression, where either node 37 or node 38 will be executed depending on the value of variable c, block 25 is executed next.

At this point the execution is ready to interpret each branch of the conditional branch node. For each successor node of the conditional branch node, n, make a duplicate instance of the shadow symbol table, and symbolically evaluate the nodes of each branch, where the starting node is changed to node n, and the end node is changed to the meet point for the conditional branch node. Therefore, symbolic evaluation is performed on each node in each branch until the meet point is reached. The shadow symbol table for each branch is modified accordingly to reflect the interpretation of each branch.

In EXAMPLE A, two instances of the shadow symbol table are constructed. Each conditional branch is evaluated up to meet point node 40, and the results are recorded in the respective shadow symbol tables. For example, variable i is interpreted and assigned the value of "y", as instructed by the expression in node 37. Upon completion of this assignment, node 40 or the meet point is reached, therefore interpretation of the true branch is completed. At the end of interpreting the true branch, the shadow symbol table is:

TABLE B c: "c"
x: "x"
y: "y"
i: "y"

Similarly, a shadow symbol table for the false branch of data flow graph of EXAMPLE A can be constructed:

TABLE C c: "c"
x: "x"
y: "y"
i: "x"

Having reached the meet point or node 40, interpretation of the false branch is completed. At this point the recursive interpretation in block 25 (FIG. 2) is completed, and execution proceeds to block 26. In block 26, the shadow symbol tables of all the branches are merged to create conditional expressions where any corresponding expression in the tables differ. In EXAMPLE A, since interpretation of both conditional branches have reached the meet point node 40, the results of TABLES B and C are merged:

TABLE D c: "c"
x: "x"
y: "y"
i: "c?y:x"

The value for variable i is represented by the C language trinary conditional expression:

e1?e2:e3    (3)

where the expression takes on the value e2 when e1 is nonzero or true, or e3 when e1 is zero or false. Accordingly, the value of variable i is equal to the value of variable y when the value of the condition, c, is nonzero, and is equal to the value of variable x when the value of c is zero. In block 30 of FIG. 2, the conditional expression (c?y:x) is returned.

While in EXAMPLE A the conditional branch node has only two successor nodes, i.e. a true and a false branch, the preferred embodiment of the present invention is equally applicable to conditional branching statements involving multiple branches, such as a switch statement in the language C. An expression could be easily devised to allow the expansion of the trinary expression to implement multiple branching.

Returning to the present example, the control flow of a previously data-dependent algorithm is completely removed by supplying the expression (c?y:x), and the maximum parallelism possible is realized. The data-dependent conditional branches are reduced to conditional expressions that can be easily incorporated into the final data flow graph for the entire application algorithm.

Figure 4:
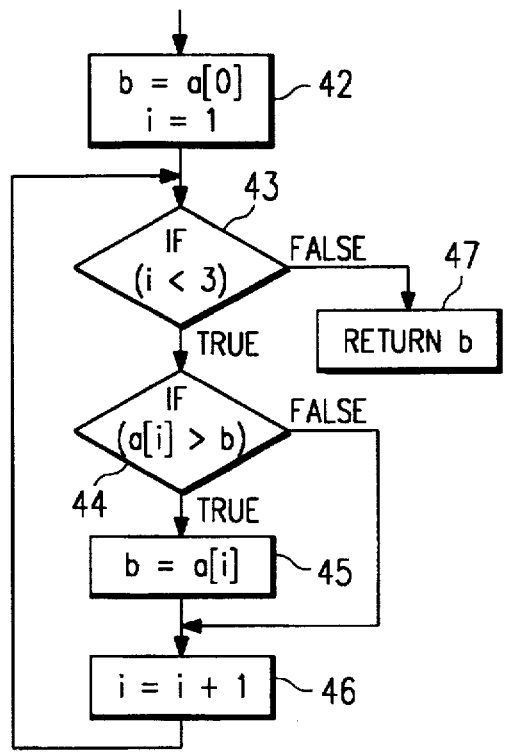
FIG. 4 is a representative control flow graph of an algorithm having a loop structure.

Additional examples are provided for a better understanding of the present invention. FIG. 4 is a representative control flow graph for the following algorithm to demonstrate symbolic interpretation of a loop structure:

```
int a[3];
int EXAMPLE_B(void)
{
    int i;
    int b = a[0];
    for (i = 1; i < 3; i++)
    {
        if (a[i] > b)
            b = a[i];
    }
    return b;
}
```

EXAMPLE B

The control flow graph in FIG. 4 contains nodes 42–47. Following the steps outlined in FIG. 2, the reverse dominators are computed. The resultant reverse dominators as computed by algorithm (1) are:

R(42): {42, 43, 47}
R(43): {43, 47}
R(44): {43, 44, 46, 47}
R(45): {43, 45, 46, 47}
R(46): {43, 46, 47}
R(47): {47}

A meet point is then computed for each conditional branch nodes 43 and 44, as shown in block 18 and using algorithm (2) described above. For node 43, the only reverse dominator besides itself is node 47. Therefore, node 47 is the meet point for the conditional branch in node 43. For node 44, node 46 is the meet point.

The symbolic evaluation proceeds by constructing a shadow symbol table as follows (block 20 in FIG. 2):

TABLE E a[0]: "a[0]"
a[1]: "a[1]"
a[2]: "a[2]"

Symbolic evaluation then proceeds by starting at node 42. The two assignment statements in node 42 are interpreted resulting in the shadow symbol table:

TABLE F

| | |
|---|---|
| a[0]: | "a[0]" |
| a[1]: | "a[1]" |
| a[2]: | "a[2]" |
| i: | "1" |
| b: | "a[0]" |

Subsequently, in node 43, the first conditional branch is encountered. Since the conditional expression (i<3) involves the variable i for which the value is known, this is not a data-dependent conditional branch. Since i is currently 1, execution proceeds to node 44, where a data-dependent conditional branch is encountered. Node 44 is a conditional branch node, dependent on the condition (a[i]>b), which is "a[1]>a[0]" in the shadow symbol table, since variable b has been set to equal to "a[0]". The condition "a[1]>a[0]" will be used when the shadow symbol tables are merged.

Since the condition (a[i]>a[0]) is data-dependent, each branch is interpreted until its meet point node 46 is reached. This corresponds to the execution in block 25 in FIG. 2. The true condition of (a[i]>a[0]) results in the shadow symbol table:

TABLE G

| | |
|---|---|
| a[0]: | "a[0]" |
| a[1]: | "a[1]" |
| a[2]: | "a[2]" |
| i: | "1" |
| b: | "a[1]" |

For the false condition, the value of variable b remains unchanged, and therefore the resulting shadow symbol table is the same as TABLE F. At node 46, the meet point, the shadow symbol tables F and G are merged for the first iteration of the loop using the condition of the branch, "a[1]>a[0]", as the condition:

TABLE H

| | |
|---|---|
| a[0]: | "a[0]" |
| a[1]: | "a[1]" |
| a[2]: | "a[2]" |
| i: | "1" |
| b: | "(a[1] > a[0]) ? a[1] : a[0]" |

Interpretation proceeds from the meet point, the value for variable i is increased by one in node 46:

TABLE I

| | |
|---|---|
| a[0]: | "a[0]" |
| a[1]: | "a[1]" |
| a[2]: | "a[2]" |
| i: | "2" |
| b: | "(a[1] > a[0]) ? a[1] : a[0]" |

Execution proceeds to node 43, where the conditional branch is evaluated again. Since the condition is true, execution proceeds to node 44, a data-dependent conditional branch node. Node 44 is a conditional branch node which is dependent on the condition (a[i]>b), which, in the context of the shadow symbol table, is now:

"a[2]>((a[1]>a[0])?a[1]:a[0])"

Again, an instance of the shadow symbol table is constructed for each branch and its value interpreted, as shown in block 25 in FIG. 2.

For the false branch, the values in the shadow symbol table remain unchanged. For the true branch, the shadow symbol table is:

TABLE J

| | |
|---|---|
| a[0]: | "a[0]" |
| a[1]: | "a[1]" |
| a[2]: | "a[2]" |
| i: | "2" |
| b: | "a[2]" |

At node 45, shadow symbol tables I and J are merged. Since they only differ in the value of variable b, only its value is changed in the merge step. The condition at the conditional branch is used as the selector in the conditional expression, resulting in the following shadow symbol table:

TABLE K

| | |
|---|---|
| a[0]: | "a[0]" |
| a[1]: | "a[1]" |
| a[2]: | "a[2]" |
| i: | "2" |
| b: | "(a[2] > ((a[1] > a[0]) ? a[1]:a[0])) ? a[2]:(a[1] > a[0]) ? a[1]:a[0]" |

When node 46 is evaluated again, the value of variable i is increased to 3. Execution returns to node 43 again. Node 43 is interpreted, in which the condition becomes false, since i is now 3 and is no longer less than 3. Therefore, execution proceeds to node 47, where the value of variable b:

"(a[2]>((a[1]>a[0])?a[1]:a[0]))?a[2]:(a[1]>a[0])?a[1]:a[0]", as shown in shadow symbol table K, is returned.

This example illustrates the advantages of maintaining the expressions in a directed acyclic graph. The value of variable b above contains the subexpression "(a[1]>a[0])?a[1]:a[0]" twice, which can be economically represented as a single expression in a tree structure.

A final example illustrates the instant invention as applied to a loop where the number of iterations is data-dependent. The example algorithm is shown below and its corresponding control flow graph is shown in FIG. 5.

```
int a[3];
int EXAMPLE C(void)
{
    int i;
    int b = a[0];
    for (i = 1; i < 3; i++)
    {
        if (a[i] > b)
            b = a[i];
        if (a[i] > 10) break;
    }
    return b
}
```

EXAMPLE C

Figure 5:
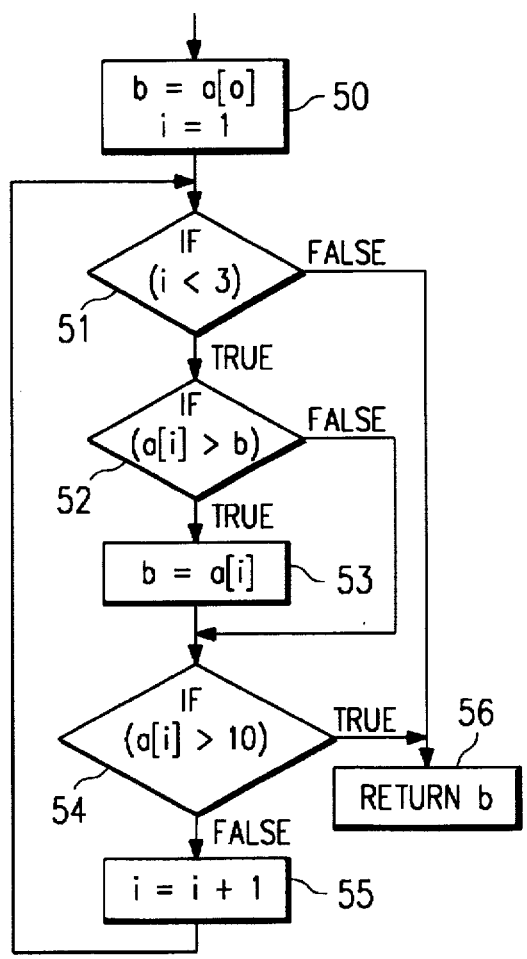
FIG. 5 is a representative control flow graph of an algorithm having a loop structure whose number of iterations is dependent on an input datum.

As shown in FIG. 5, the control flow graph for EXAMPLE C contains nodes 50–56, of which nodes 51, 52 and 54 are conditional branch nodes.

Following the steps outlined in FIG. 2, in block 16 the reverse dominators are computed in accordance with algorithm (1) above with the following results:

| | |
|---|---|
| R(50): | {50, 51, 56} |
| R(51): | {51, 56} |
| R(52): | {52, 54, 56} |
| R(53): | {53, 54, 56} |
| R(54): | {54, 56} |
| R(55): | {51, 55, 56} |
| R(56): | {56} |

In block 18, the meet points for nodes 51, 52 and 54 are computed from the reverse dominators in accordance with algorithm (2) above. For node 51, the meet point is node for node 52, the meet point is node 54; and for node 54, the meet point is node 56.

Symbolic evaluation of EXAMPLE C algorithm begins by constructing a shadow symbol table containing the arguments, static variables and global variables and their respective symbolic values. Symbolic evaluation then proceeds by starting at the first node of the control flow graph, or node 50. After the assignment expressions in node 50, the shadow symbol table looks like this:

TABLE L

| | |
|---|---|
| a[0]: | "a[0]" |
| a[1]: | "a[1]" |
| a[2]: | "a[2]" |
| i: | "1" |
| b: | "a[0]" |

In node 51, there is a conditional expression the value of which depends only on known values, therefore the condition is evaluated and execution proceeds to node 52 since the variable i is currently less than 3. Node 52 contains a data-dependent conditional expression (a[i]>b), which has been interpreted to be "a[1]>a[0]". Therefore two instances of the shadow symbol table are constructed and each branch of the conditional branch is evaluated separately until the meet point is reached. The false branch of the condition results in an unchanged shadow symbol table, but the true branch results in the following modified table:

TABLE M

| | |
|---|---|
| a[0]: | "a[0]" |
| a[1]: | "a[1]" |
| a[2]: | "a[2]" |
| i: | "1" |
| b: | "a[0]" |

At node 54, which is the meet point, the two instances of the shadow symbol table are merged. Shadow symbol tables L and M differ only in the value of the variable b. The condition at the conditional branch is used as the selector in a conditional expression, which yields:

TABLE N

| | |
|---|---|
| a[0]: | "a[0]" |
| a[1]: | "a[1]" |
| a[2]: | "a[2]" |
| i: | "1" |
| b: | "(a[1] < a[0]) ? a[1]:a[0]" |

In interpreting node 54, it is recognized as another data-dependent conditional branch. Node 54 is dependent on the condition (a[i]>10), which, in the context of the present shadow symbol table, is the data-dependent condition (a[1]>10). Since this condition is data-dependent, its branches must be interpreted successively.

EXAMPLE C illustrates an important aspect of the present technique. The data-dependent branch in node 54 is within a loop structure, so the false branch of that node will reach the data-dependent condition in node 54 before reaching the meet point node 56. In this instance, the interpreter recursively evaluates the subsequent conditional branch until its meet point at node 56, which yields the result of the false branch. At which point, the two paths of the original conditional branch at node 54 reach their meet point node 56, and can be merged as well. Although this example only recurses two-deep, the technique is applicable to an arbitrary recursion depth when the control flow graph has loops containing data-dependent branches that require further iterations. For example, if the condition in node 51 of the EXAMPLE C algorithm were changed to (i<10), then the method would recurse to a depth of 9.

In evaluating node 54, duplicate instances of the shadow symbol table are constructed. The true branch of the condition (a[1]>10) leads immediately to the meet point (node 56), therefore the shadow symbol table remains unchanged. On the other hand, the false branch of the condition in node 54 leads to node 55, which alters the shadow symbol table by incrementing the value of variable i:

TABLE O

| | |
|---|---|
| a[0]: | "a[0]" |
| a[1]: | "a[1]" |
| a[2]: | "a[2]" |
| i: | "2" |
| b: | "(a[1] < a[0]) ? a[1]:a[0]" |

Proceeding to node 51, the true condition therein leads to node 52. Since node 52 contains a data-dependent conditional branch, two further instances of the shadow symbol table O are constructed and each branch is evaluated until the meet point (node 54) is reached. Node 52 is dependent on the value of the expression:

$$(a[2]>(a[1]>a[0])?a[1]:a[0])$$

The false branch of conditional branch node 51 leads immediately to the meet point node 56 without modifying the shadow symbol table, while the true branch assigns the value of "a[2]" to variable b:

TABLE P

| | |
|---|---|
| a[0]: | "a[0]" |
| a[1]: | "a[1]" |
| a[2]: | "a[2]" |
| i: | "2" |
| b: | "a[2]" |

Merging the two instances of the shadow symbol table (TABLES O and P) at the meet point (node 54), the resultant shadow symbol table is:

TABLE Q

| | |
|---|---|
| a[0]: | "a[0]" |
| a[1]: | "a[1]" |
| a[2]: | "a[2]" |
| i: | "2" |
| b: | "(a[2] > (a[1] > a[0] ? a[1]:a[0]) ? a[2]:(a[1] > a[0]) ? a[1]:a[0]" |

Evaluating node 54, the data-dependent conditional expression (a[2]>10) requires another branching evaluation. Note that the false branch of the original conditional branch node 54 is still being evaluated here. Node 54 is a conditional branch that depends on a condition whose value in the context of the shadow symbol is (a[2]>10). Both true and false branches are again evaluated up to meet point node 56, and merged. The true branch jumps directly to the meet point without altering the shadow symbol table. The false branch first increments variable i in node 55, and then jumps there through the data-dependent condition in node 51. Merging the results, in which only the value for variable i differs, the resultant shadow symbol table is:

TABLE R

| | |
|---|---|
| a[0]: | "a[0]" |
| a[1]: | "a[1]" |
| a[2]: | "a[2]" |
| i: | "(a[2] > 10) ? 2:3" |
| b: | "(a[2] > (a[1] > a[0]) ? a[1]:a[0]) ? a[2]:(a[1] > a[0]) ? a[1]:a[0]" |

Since the interpretation of the false branch of node 54 now reaches the meet point, node 56, the shadow symbol table, TABLE N, for the true branch is merged with the shadow symbol table for the false branch, TABLE R. The resultant shadow symbol table is:

TABLE S

| | |
|---|---|
| a[0]: | "a[0]" |
| a[1]: | "a[1]" |
| a[2]: | "a[2]" |
| i: | "(a[2] > 10) ? 1:(a[2] > 10) ? 2:3" |
| b: | "(a[1] > 10) ? ((a[1] > a[0]) ? a[1]: a[0]):((a[2] > (a[1] > a[0]) ? a[1]: a[0]) ? a[2]:(a[1] > a[0]) ? a[1]: a[0]" |

Therefore, upon reaching node 56, the value of variable b, as shown in TABLE S above, is returned.

It can be seen that the present invention is interested in returning conditional expressions of global variables and the conditional expressions of those variables which are explicitly returned in a return statement. Furthermore, in the context of computing for meet points where return statements are embedded within a conditional branch, the return statement is treated as an implicit branch to a unique exit node in the control flow graph. Implemented in this manner, all conditional branches are guaranteed to have a meet point.

Although the present invention has been described in detail, it should be understood that various changes, substitutions and alterations can be made thereto without departing from the spirit and scope of the present invention as defined by the appended claims.

What is claimed is:

1. A method for translating a computer program using a programmable digital computer to a data flow graph, said computer program having a plurality of statements manipulating the value of a plurality of variables, and further having at least one conditional branching statement depending on the value of a data-dependent condition, the method comprising the steps operating on said computer of:

converting said computer program into a control flow graph having a plurality of nodes including a start node and an end node, each node representing at least one of said plurality of statements, and including a conditional branch node for said data-dependent conditional branching statement;

computing a set of reverse dominators for each of said plurality of nodes;

deriving a meet point node for each conditional branch node in response to said reverse dominators;

constructing a shadow symbol table having symbolic values for said variables;

evaluating each node symbolically in succession according to control flow, and assigning a symbolic value to each said variables in said shadow symbol tables;

evaluating said conditional branch node, constructing a duplicate shadow symbol table for each possible value of said data-dependent condition in response to said conditional branch node, assuming each possible value of said data-dependent condition and assigning symbolic values to each said variables in said duplicate shadow symbol tables;

continue evaluating nodes contained in each branch of said conditional branching statement until said meet point node is reached;

merging said duplicate shadow symbol tables at each said meet point node;

complete evaluating all conditional branches and reaching said end node of said control flow graph; and generating a data flow graph with a conditional expression that is no longer data-dependent for each data-dependent conditional branching statement.

2. The method, as set forth in claim 1, wherein said control flow graph converting step includes the step of providing a list of successor nodes for each said plurality of nodes, where said end node does not have any successor nodes.

3. The method, as set forth in claim 2, wherein said reverse dominator computing step includes the steps of:

initializing a set of reverse dominator candidates for each node to include all of said nodes in said control flow graph, including each node itself;

modifying the reverse dominator candidate set for said end node to include only the node itself;

for each node, performing an intersection of its reverse dominator candidate set with the reverse dominator candidate sets of all of its successor nodes, adding the node itself, and producing a resultant reverse dominator candidate set; and repeating the above step until no changes in said reverse dominator candidate sets occur, and producing a resultant reverse dominator set for each node.

4. The method, as set forth in claim 3, wherein the step of deriving a meet point node for a conditional branch node includes the step of selecting a reverse dominator, from among its set of reverse dominators, excluding the node itself, one which is reverse dominated by all other reverse dominators in the set.

5. The method, as set forth in claim 1, wherein said merging step includes the steps of:

using a conditional trinary expression:

e1?e2:e3, where e1 is the data-dependent condition of the conditional branch node, e2 is the value of a variable if the condition were true, and e3 is the value of the variable if the condition were false;

substituting the data-dependent condition for e1;

substituting the symbolic values, assigned to variables in said duplicate shadow symbol table assuming a true condition for said data-dependent condition, for e2; and substituting the symbolic values, assigned to variables in said duplicate shadow symbol table assuming a false condition for said data-dependent condition, for e3.

6. The method, as set forth in claim 1, wherein said merging step includes the step of combining the values of said variables in said duplicate shadow symbol tables and specifying when each said values are assumed by the variables for each possible value of said data-dependent condition.

7. A translator for translating a computer program to a data flow graph where said computer program has at least one conditional branching statement leading to at least two branches assigning differing values to a variable depending on the value of a data-dependent condition, comprising:

means for converting said algorithm into a control flow graph having a plurality of nodes, one of said nodes representing said conditional branch node;

means for computing a set of reverse dominators for each of said plurality of nodes;

means for deriving a meet point node where said branches of said conditional branching statement will converge, in response to said computed reverse dominators;

means for constructing a shadow symbol table having said conditional expression and said variable;

means for symbolically evaluating each node in said control flow graph in succession;

means for evaluating said conditional branch node, and constructing one instance of said shadow symbol tables for each branch of said conditional branch node in response to evaluating said conditional branch node by assuming each possible value of said data-dependent condition;

means for assigning symbolic values to said variable in said respective instances of said shadow symbol tables in response to evaluating each branch of said conditional branching statement until reaching said meet point node;

means for merging said instances of said shadow symbol table upon reaching said meet point node;

means for evaluating all conditional branches and reaching said end node of said control flow graph;

means for generating a data flow graph with a conditional expression that is no longer data-dependent for each data dependent conditional branching statement.

8. The translator, as set forth in claim 7, wherein said means for converting said control flow graph includes means for providing a list of successor nodes for each said plurality of nodes, and one end node which does not have any successor nodes.

9. The translator, as set forth in claim 8, wherein said reverse dominator computing means includes:

means for initialing a set of reverse dominator candidates for each node to include all of said nodes in said control flow graph, including each node itself;

means for modifying the reverse dominator candidate set for said end node without any successor nodes to include only itself;

means for performing, for each node, an intersection of its reverse dominator candidate set with the reverse dominator sets of all of its successor nodes, adding the node itself, and producing a resultant reverse dominator candidate set, until no changes in said reverse dominator candidate sets occur, and producing a resultant reverse dominator set for each node.

10. The translator, as set forth in claim 9, wherein the means for deriving a meet point node includes means for selecting the reverse dominator, from among said sets of reverse dominator candidates for each node, one which reverse dominates all other reverse dominator candidates.

11. The translator, as set forth in claim 7, wherein said merging means uses a conditional trinary expression:

e1?e2:e3, where e1 is the data-dependent condition of the conditional branch node, e2 is the value of a variable if the condition were true, and e3 is the value of the variable if the condition were false;

substituting the data-dependent condition for e1;

substituting the symbolic values, assigned to variables in said duplicate shadow symbol table assuming a true condition for said data-dependent condition, for e2; and substituting the symbolic values, assigned to variables in said duplicate shadow symbol table assuming a false condition for said data-dependent condition, for e3.

12. The translator, as set forth in claim 11, wherein said merging means further includes the step of combining the values of said variable in said instances of said shadow symbol tables and specifying when each said values are assumed by said variable for each possible value of said data-dependent condition.

13. A method for generating hardware circuits from a computer program, said computer program having a plurality of statements manipulating the value of a plurality of variables, and further having at least one conditional branching statement depending on the value of a data-dependent condition, the method comprising the steps operating on said computer of:

converting said computer program into a control flow graph having a plurality of nodes including a start node and an end node, each node representing at least one of said plurality of statements, and including a conditional branch node for said data-dependent conditional branching statement;

computing a set of reverse dominators for each of said plurality of nodes;

deriving a meet point node for each conditional branch node in response to said reverse dominators;

constructing a shadow symbol table having symbolic values for said variables;

evaluating each node symbolically in succession according to control flow, and assigning a symbolic value to each said variables in said shadow symbol tables;

evaluating said conditional branch node, constructing a duplicate shadow symbol table for each possible value of said data-dependent condition in response to said conditional branch node, assuming each possible value of said data-dependent condition and assigning symbolic values to each said variables in said duplicate shadow symbol tables;

continue evaluating nodes contained in each branch of said conditional branching statement until said meet point node is reached;

merging said duplicate shadow symbol tables at each said meet point node;

complete evaluating all conditional branches and reaching said end node of said control flow graph; and generating a data flow graph with a conditional expression that is no longer data-dependent for each data-dependent conditional branching statement; and the further step of generating hardware circuits for each said conditional expression from said resultant program data flow graph.

14. A method for compiling a computer program, said computer program having a plurality of statements manipulating the value of a plurality of variables, and further having at least one conditional branching statement depending on the value of a data-dependent condition, the method comprising the steps operating on said computer of:

converting said computer program into a control flow graph having a plurality of nodes including a start node and an end node, each node representing at least one of said plurality of statements, and including a conditional branch node for said data-dependent conditional branching statement;

computing a set of reverse dominators for each of said plurality of nodes;

deriving a meet point node for each conditional branch node in response to said reverse dominators;

constructing a shadow symbol table having symbolic values for said variables;

evaluating each node symbolically in succession according to control flow, and assigning a symbolic value to each said variables in said shadow symbol tables;

evaluating said conditional branch node, constructing a duplicate shadow symbol table for each possible value of said data-dependent condition in response to said conditional branch node, assuming each possible value of said data-dependent condition and assigning symbolic values to each said variables in said duplicate shadow symbol tables;

continue evaluating nodes contained in each branch of said conditional branching statement until said meet point node is reached;

merging said duplicate shadow symbol tables at each said meet point node;

complete evaluating all conditional branches and reaching said end node of said control flow graph;

generating a data flow graph with a conditional expression that is no longer data-dependent for each data-dependent conditional branching statement; and compiling said computer program using said data flow graph.

* * * * *